Aug. 13, 1929.　　　G. A. RICHTER　　　1,724,421
PRODUCTION OF GAS STRONG IN SULPHUR DIOXIDE
Filed March 26, 1923
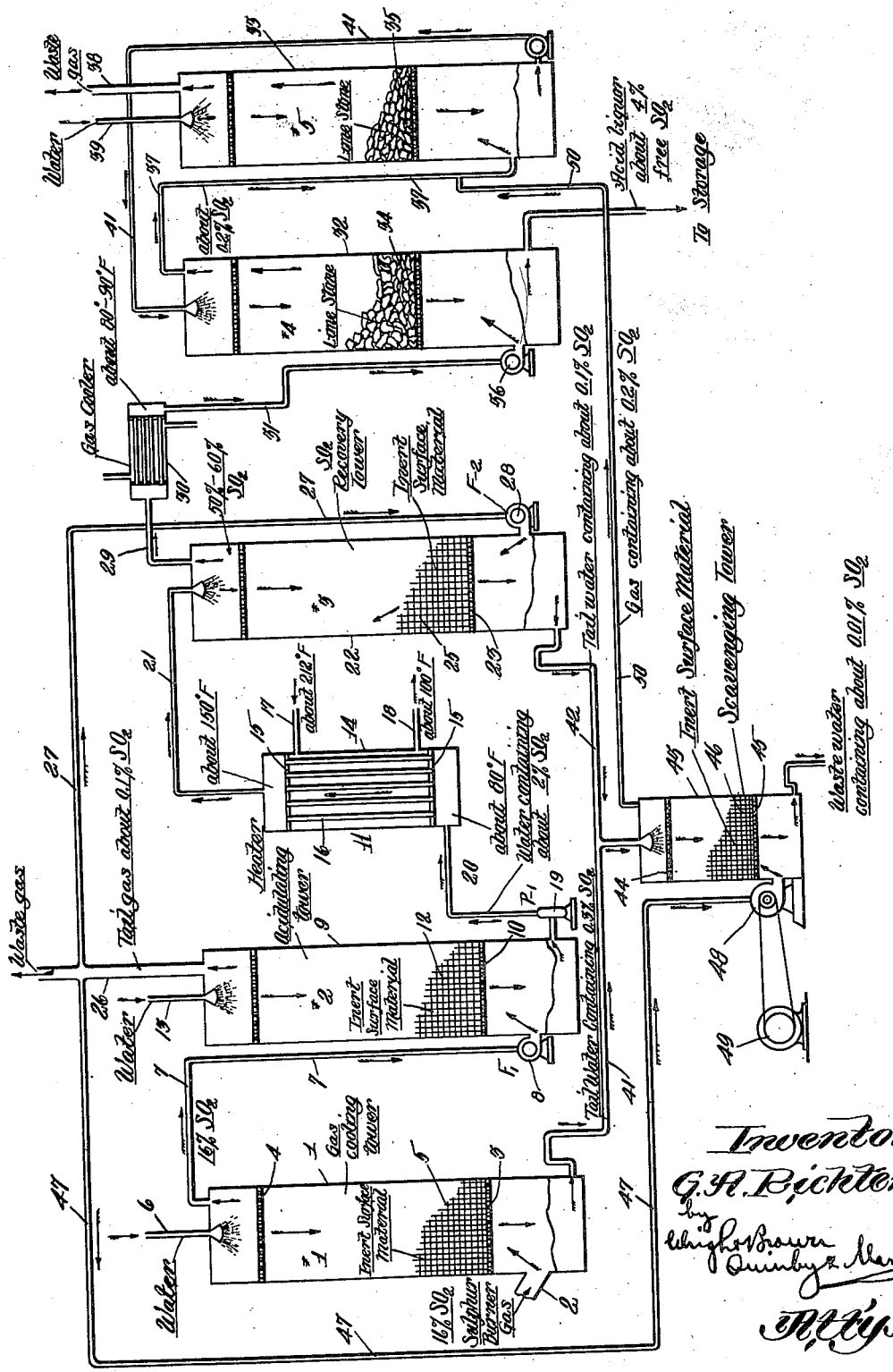
Inventor
G. A. Richter Patented Aug. 13, 1929.

1,724,421

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

PRODUCTION OF GAS STRONG IN SULPHUR DIOXIDE.

Application filed March 26, 1923. Serial No. 627,600.

This invention has relation to the recovery and utilization of sulphur dioxide from sulphur burner gases, such as evolved by the combustion of sulphur or a sulphur-bearing material, although it is applicable for recovering any other soluble gas from a mixture of gases.

The object of the invention more particularly is to effect a maximum recovery of the sulphur dioxide from sulphur burner gases so as to eliminate waste thereof, and so that it may be utilized either in the formation of a cooking acid liquor or otherwise as may be desired. Generally speaking, the sulphur dioxide is recovered in the form of two bodies of gases having different strengths in $SO_2$, one having a high proportion of $SO_2$ and the other having a relatively low proportion of $SO_2$. This is particularly advantageous in the formation of acid cooking liquor such as calcium bisulphite in which it is desired to have the liquor possess a high strength in sulphurous acid or free $SO_2$.

Another object of the invention is to accomplish the results by a relatively inexpensive apparatus which requires practically no attention and which will function so as to produce under given conditions substantially unvarying results.

It is known that, if a mixture of gases containing a definite percentage of a soluble gas be passed through water confined in a chamber under given conditions of temperature and pressure, the water will absorb or dissolve therein a definite proportion of the soluble gas,—an equilibrium being established between the gas in the atmosphere above the liquor and the gas in the liquor. This is generally referred to as the saturation point of the water under the given conditions. This saturation point, however, varies according to the temperature and the pressure, and also according to the percentage of the soluble gas in the original mixture. I utilize this principle or phenomenon in recovering, from the burner gas, $SO_2$ in two bodies of mixed gases containing different proportions of $SO_2$; and accordingly, with a relatively inexpensive apparatus, I am able to produce one body of gas having from 50% to 60% $SO_2$ which may be liquefied for such use as may be desired, or employed in forming an acid cooking liquor containing a high free $SO_2$ content, and also another body containing a relatively small proportion of gas, which may be utilized in forming the cooking liquor or in other ways as may be desired. When such mixture of gases having small percentage of $SO_2$ is utilized in an absorption system for producing a cooking acid liquor, it is introduced into the system at the point where it will not have the effect of diluting the gases delivered for absorption to the towers.

In utilizing the principle hereinbefore referred to, the $SO_2$ is absorbed from the burner gases in a body of water in a confined space (as in a tower) under certain conditions of temperature and pressure, so that the water absorbs, under such conditions, a certain percentage by weight of $SO_2$. The water is then transferred to another confined space or tower under different conditions of temperature (i. e. it is heated), and is swept by a stream of gas containing either no, or a very small proportion of, $SO_2$. Under such conditions, to reestablish an equilibrium of $SO_2$ in the water and $SO_2$ in the atmosphere above the water in the last-mentioned space or tower, the water gives up absorbed or dissolved $SO_2$, and the sweeping gases are thereby strengthened with $SO_2$. The higher temperature, to which the acidulated water is subjected, permits a much higher concentration of $SO_2$ in the resulting gases than originally in the initial gas delivered to the first confined space or tower. While this enables one to recover most of the $SO_2$ of the initial burner gases in a relatively concentrated form, yet there is a certain loss due to the inability to recover in a practicable apparatus all of the gas absorbed by the water. Therefore, to reduce the loss to negligible proportions, the acidulated water, after being swept with a limited volume of the gases having little or no $SO_2$, is again swept with a large volume of such gases to recover the residual $SO_2$ in a less concentrated form.

In practice, burner gases must be cooled, and, if this be accomplished by direct contact with water, the latter absorbs a small amount of $SO_2$, and this may be recovered simultaneously with the recovery of $SO_2$ from the waste acidulated water in the sweeping operation last referred to.

On the accompanying drawing, I have conventionally illustrated apparatus which may be utilized in carrying out my process.

Referring to the drawing, I have illustrated at 1 a cooling tower, to the lower end of which is introduced the products of combustion of a sulphur burner, the inlet for the burner gas being indicated at 2. This cooler is provided, between perforated partitions or grids 3 and 4, with a mass of inert intersticial material such as spiral brick indicated conventionally at 5. Cold water is introduced to the top of the tower through an inlet pipe 6 which may be provided with the usual spraying head, so that the gas and the water flow in counter current through the tower. The purpose of this is two-fold; namely, to cool the gas and to purify it during its passage to the tower by the elimination of any solid particles which may pass with the burner gas from the burner. Ordinarily the burner gas enters the lower end of the tower at a temperature of about 1200° F. and such gas comprises about 16% $SO_2$, a small percentage of oxygen, and a large percentage of nitrogen. During its passage through the cooler, the gas is cooled to a temperature of about 80° F., this being regulated by the flow of the water through the tower at seasonable temperatures. From the top of the tower the gas is conducted by a main 7 to a pump 8 which delivers it into the lower end of a tower 9, which I may refer to as an absorption tower inasmuch as a large portion of the $SO_2$ of the cooled burner gas is absorbed by water therein. This tower does not differ substantially from that indicated at 1, being provided with perforated partitions or grids 10, 11, between which is a mass of spiral brick or other inert intersticial material indicated at 12. Cold water is delivered to the upper end of the tower by the pipe 13 which may be provided with a nozzle or spraying device. The pressure in this tower is atmospheric; and, as the cold water and the cooled gas pass in counter-current flow through the confined space formed by the tower,— the gas entering it at a temperature of about 80° F.,—practically all of the $SO_2$ in the entering gas is absorbed by the water. Under these condition of temperature, pressure and counter-current flow, the water in the lower portion of the tower contains approximately 2% by weight of $SO_2$, and the tail gas from the top of the tower contains, by volume, approximately .1% $SO_2$, a small percentage of oxygen and the remainder nitrogen. In accordance with my process, I now recover from the acidulated water $SO_2$ in a relatively concentrated form. This is accomplished by a sweeping operation in a confined space, the sweeping agent consisting of the tail gas delivered from the tower 9. Before subjecting the acidulated water to the sweeping operation, it is necessarily heated to a higher temperature, which in practice is from 130° to 160° F., depending upon the availability of the waste heat. For example, this waste heat in a sulphite pulp mill may be obtained from the relief liquor or gases from the digester, so that in this case the heater would perform multiple functions; that is, of heating the liquor from the tower 9 and also cooling the relief gases or liquor from the digester prior to their re-use. In the digestion of pulp in the sulphite process, it is commonly the practice to cool the "relief", so that it may be utilized, and such a cooler may be employed as a heat exchanger for heating the acidulated water from tower 9. A heater, such as referred to, is indicated at 14, and it is illustrated conventionally as having the tube sheets 15, 15 and tubes 16. The hot "relief" is introduced into the space between the partitions through a pipe 17 and the cooled "relief" is conducted from the heater by the pipe 18. The acidulated water from the lower end of tower 9 is forced by a pump 19 through pipe 20 to the lower end of the heater 14, and, after being heated, is conducted through a pipe 21 to the upper end of a sweeping or recovery tower 22. This tower does not differ essentially in its construction from those indicated at 1 and 9, being provided with perforated partitions or grids 23, 24, between which is interposed a mass of spiral brick or other inert intersticial material 25. In passing through the heater 14, the acidulated water (containing as aforesaid approximately 2% by weight of $SO_2$ gas) is heated to a temperature of about 150° F. more or less, and, being delivered in the form of a spray into the top of tower 22, trickles downwardly through the intersticial material therein. As it is passing through the inert material, it is subjected to the sweeping action of the gas which is taken from the tail pipe 26 leading from the top of tower 9. An advantage, which is derived from using the tail gas from tower 9 in sweeping the liquor in tower 22, is that the tail gas contains a very small percentage of oxygen, and consequently I am able to avoid the formation of sulphuric acid. If this is of no moment, however, atmospheric air (or other nonsoluble gases containing little or no $SO_2$) may be utilized as the sweeping medium. In practice, however, when the strong recovered gas is utilized in the formatiton of an acid cooking liquor, it is decidedly advantageous to use the tail gas as the sweeping medium.

As illustrated on the drawing, a branch pipe 27 leads from the eduction or tail pipe 26 to a fan 28 of relatively small capacity, by which the tail gas is forced into the lower end of tower 22. The gas, passing upwardly through tower 22 in countercurrent flow to the acidulated water at slightly less than atmospheric pressure, becomes progressively stronger in $SO_2$, so that, when delivered from the top of the tower through the pipe 29, it contains approximately 50% to 60% by volume of $SO_2$. The acidulated water, in passing downwardly through the tower, becomes progressively weaker in $SO_2$ and finally emerges from the lower end of the tower as a solution containing approximately .1% $SO_2$ by weight. The strong gas issuing from the tower 22 through the pipe 29, which is at a temperature of approximately 140° F., is preferably passed through a cooler indicated at 30 and is cooled to a temperature of approximately 80° F. to 90° F. This gas, delivered from the cooler by pipe 31, may be liquefied by pressure, or it may be passed through lime towers or other form of absorption system utilized in the manufacture of calcium bisulphite cooking liquor. On the drawing, I have illustrated conventionally an absorption system, comprising the two towers 32, 33, each being provided between its perforated partitions or grids with lime-stone as indicated at 34, 35. The strong gas from the cooler 30 is conducted by a pipe 31 to a pump 36 by which it is delivered to the lower end of tower 32. The tail gas from the top of tower 32 passes through pipe 37 to the lower end of tower 33 and emerges therefrom through the vent or tail pipe 38. Water is delivered by pipe 39 to the top of tower 33, and, passing downwardly through the lime-stone in counter-current flow to the gas passing upwardly therethrough, is formed into a weak calcium bisulphite solution. This weak acid liquor is now pumped by a pump 40 through pipe 41 to the top of tower 32, wherein it is fortified by the strong gas from the cooler 30. The liquor leaving the tower 32 contains approximately 4% to 5% free $SO_2$.

The tail liquor in the towers 1 and 22 contains a relatively small percentage of $SO_2$. In the initial cooling tower 1, the tail liquor contains about .3% $SO_2$, while that from the tower 22 contains approximately .1% $SO_2$. If the liquor, however, were wasted, it would represent a substantial loss in sulphur. I provide means for recovering the greater part of this gas which represents about 5% to 8% of the $SO_2$ delivered from the burner to tower 1. From the lower ends of the towers 1 and 22, the tail pipes 41, 42 deliver the tail water to the top of a scavenging tower which is indicated at 43. This tower, which is of small size relatively to the other towers hereinbefore referred to, is provided with perforated partitions or grids 44, 45, between which is a mass of spiral brick or other intersticial material indicated at 46. In passing through the intersticial material, the greater portion of $SO_2$ in the water entering therein is swept from the water and recovered. To this end, I preferably utilize a part of the tail gas from the tower 9, and I therefore provide a branch pipe 47 leading from the tail pipe 26 to a pump 48. This pump is preferably one of large capacity, and, being driven by a variable-speed motor indicated conventially at 49, delivers the gas to the lower end of the tower 43. In passing upwardly through the intersticial material, the gas, which is weak in oxygen and consists to the greater extent of nitrogen, sweeps the $SO_2$ from the liquor so that the tail gas, leaving tower 43 through the pipe 50, contains approximately 2% $SO_2$. The same phenomenon occurs in the tower 43 that occurs in tower 22; that is, that as the gas flows upwardly through the spiral brick, it grows progressively stronger in $SO_2$; and the liquor, flowing downwardly through the spiral brick, gradually and progressively loses the $SO_2$. There is this difference, however, between the two towers: In tower 22 I purposely employ a relatively small volume of tail gas for sweeping purposes, so that the gas leaving the tower has a high percentage of $SO_2$; and in tower 43, on the contrary, I employ a fan having a large capacity so that a large volume of the tail gas is swept through the tower, with the result that the gas leaving the tower has a small percentage of $SO_2$. This latter is for purposes of economy. The advantage of the tower 43 is that it may be operated economically even though the liquors in towers 1 and 22 vary considerably in the amount of $SO_2$ contained therein. Inasmuch as the gas from the scavenging tower 43 is relatively weak, it must not be mixed with the gas from tower 22, as the latter would thereby be greatly diluted therewith. It may, with the greatest economy, be utilized in the acid-liquor-forming system at a point where it will have no diluting effect. I have therefore shown the pipe 50 as being connected with the pipe 37 by which the tail gas from the absorption tower 32 is conducted to the absorption tower 33. The gas passing between these two towers contains about 2% $SO_2$, so that the addition of the gas from the scavenging tower 43 thereto does not dilute it, since it has substantially the same percentage of $SO_2$.

The tail water from the tower 43 contains ordinarily in actual practice about .01% $SO_2$, and therefore represents a loss which is trifling or negligible. The hot tail water may be used for general heating purposes; in fact, it may be delivered to a heat exchanger for preliminarily heating the acidulated water from tower 9 before it is delivered to the heater 14.

I have referred to the fact that the fan 48 is operated preferably by a variable-speed motor. In a mill having a constant production, it is not necessary to employ a variable-speed motor; but, in those cases where it is necessary to change the basis of production from time to time, it is desirable to use such a motor.

What I claim is:—

1. A process of recovering a gas strong in $SO_2$ from sulphur burner gases, which comprises passing such gases through a confined space in contact with inert surface material and with water, in counter-current flow to said water, whereby the water progressively absorbs $SO_2$ and said gases progressively become weaker in $SO_2$, heating the acidulated water, passing said acidulated water through a confined space in contact with inert surface material, passing through said space, in counter-current to and in contact with said water, the gases delivered from the first-mentioned confined space, thereby removing $SO_2$ from the acidulated water, and producing a gas containing a high $SO_2$ content.

2. A process of recovering $SO_2$ from hot sulphur burner gases, which comprises passing such burner gases through a cooling tower in contact with and in counter-current flow to cooling water; passing the cooled gases through inert surface material in a tower, in contact with and in counter-current to cool water, thereby causing such water to absorb the greater part of the $SO_2$ of such gases; heating such acidulated water; passing such water and tail gas from the second-mentioned tower in counter-current flow through inert surface material in a third tower, and recovering the resulting gas having a high $SO_2$ content; passing the tail water from the first and third towers and tail gas from the second tower in counter-current flow through inert surface material in a fourth tower, thereby enriching said tail gas with $SO_2$ from such tail water; and recovering the resulting enriched gas.

In testimony whereof I have affixed my signature.

GEORGE A. RICHTER.